United States Patent
Shiu

(10) Patent No.: US 8,509,717 B2
(45) Date of Patent: Aug. 13, 2013

(54) FREQUENCY MODULATION RECEIVER AND RECEIVING METHOD THEREOF

(75) Inventor: Huei-Chiang Shiu, Taipei County (TW)

(73) Assignee: RichWave Technology Corp., NeiHu District, Taipei (TW)

( * ) Notice: Subject to any disclaimer, the term of this patent is extended or adjusted under 35 U.S.C. 154(b) by 866 days.

(21) Appl. No.: 12/619,960

(22) Filed: Nov. 17, 2009

(65) Prior Publication Data

US 2010/0285764 A1    Nov. 11, 2010

(30) Foreign Application Priority Data

May 5, 2009    (TW) ................................ 98114802 A

(51) Int. Cl.
*H04B 1/18*    (2006.01)
*H04K 3/00*    (2006.01)

(52) U.S. Cl.
USPC ..................................... 455/161.1; 455/192.2

(58) Field of Classification Search
USPC .................. 455/424, 425, 456.5, 456.6, 561, 455/550.1, 575.1, 164.1, 192.2, 254.1, 173.1, 455/164.2, 136, 255, 313, 205, 161.1–161.3, 455/182.1, 182.2, 196.1; 375/344, 324, 302, 375/322
See application file for complete search history.

(56) References Cited

U.S. PATENT DOCUMENTS

| | | | |
|---|---|---|---|
| 2,840,640 A * | 6/1958 | Babcock | 370/497 |
| 2,896,074 A * | 7/1959 | Newsom et al. | 324/76.44 |
| 2,976,411 A * | 3/1961 | Kahn | 455/113 |
| 2,977,409 A * | 3/1961 | Farr | 348/735 |
| 3,947,774 A * | 3/1976 | Glennon et al. | 455/164.1 |
| 4,092,602 A * | 5/1978 | Nishioka et al. | 381/3 |
| 4,387,469 A * | 6/1983 | Miyazaki et al. | 455/161.3 |
| 4,450,586 A * | 5/1984 | Fujino | 455/161.3 |
| 4,814,887 A * | 3/1989 | Marz et al. | 348/735 |
| 4,955,074 A * | 9/1990 | Omoto | 455/182.2 |
| 5,963,600 A * | 10/1999 | Rausch et al. | 375/344 |
| 6,223,061 B1 * | 4/2001 | Dacus et al. | 455/574 |
| 2009/0061801 A1 * | 3/2009 | Kobayashi | 455/150.1 |

* cited by examiner

*Primary Examiner* — Lee Nguyen
(74) *Attorney, Agent, or Firm* — Winston Hsu; Scott Margo

(57) ABSTRACT

A frequency modulation receiver is provided. The frequency modulation receiver includes an automatic frequency controller and a signal detector. The automatic frequency controller receives a demodulated frequency modulation signal demodulated from a radio frequency signal and outputs a control voltage to control an oscillation frequency of a local oscillator. The signal detector coupled to the automatic frequency controller receives the control voltage and determines whether the radio frequency signal is a frequency modulation signal according to the control voltage and a predetermined voltage range.

8 Claims, 5 Drawing Sheets

FREQUENCY MODULATION RECEIVER AND RECEIVING METHOD THEREOF

CROSS REFERENCE TO RELATED APPLICATIONS

This Application claims priority of Taiwan Patent Application No. 098114802, filed on May 5, 2009, the entirety of which is incorporated by reference herein.

BACKGROUND OF THE INVENTION

1. Field of the Invention

The invention relates to a frequency modulation (FM) receiver and receiving method thereof, and more particularly to an FM receiver with a signal detector and receiving method thereof.

2. Description of the Related Art

Frequency modulation (FM) is one type of modulation technology in electronic communications, which uses carrier wave frequency variations of a transmitted signal provided by a transmitter to represent data to be sent. Usually, the data to be sent is shown as an electronic signal, such as an electronic signal with voice information, and the amplitude of the electronic signal is reflected on the carrier wave frequency variations of the transmitted signal through FM technology according to a ratio.

In general, an FM broadcast system (radio system) is one type of application for FM technology. At present, the FM broadcast system has a frequency range between 88-109 MHz which comprises 100 channels, wherein a bandwidth of each channel is 100 kHz. A user can use an FM receiver to select a desired channel. Usually, the FM receiver has a function for searching the FM signals. The FM receiver can automatically search the channels one by one to determine whether the radio frequency (RF) signal received in each channel is an FM signal or not, i.e. FM signal search, thus avoiding manual search for the user.

In general, an FM receiver determine whether an RF signal received in a channel is an FM signal or not according to an FM signal to noise ratio (SNR) of the channel. FIG. 1 shows a block diagram illustrating a conventional FM receiver 100. The FM receiver 100 receives an RF signal R. An RF amplifier 110 amplifies the RF signal R, and then a mixer 120 down converts the amplified RF signal R to an intermediate frequency (IF). Next, the RF signal R down converted to the IF may sequentially pass an IF amplifier 130, an amplitude limiter 140 and an FM demodulator 150 so as to obtain a demodulated FM signal. The demodulated FM signal is transmitted to an SNR calculator 180 to calculate a SNR. A signal detector 190 determines whether the RF signal is an FM signal or not according to the SNR and a predetermined threshold. However, because it is difficult to obtain the SNR, the method that uses the SNR determines whether the RF signal is the FM signal or not is deficient. Various methods are used to obtain the SNR, which separate the FM signal and the noise in the channel to calculate the FM signal intensity and the noise intensity so as to obtain the SNR. However, a more complex system is required, thus increasing cost for the FM receiver.

Therefore, an FM receiver and a receiving method thereof are desired to decrease system complexity and cost.

BRIEF SUMMARY OF THE INVENTION

Frequency modulation receivers and receiving method thereof are provided. An exemplary embodiment of such a frequency modulation receiver for a frequency modulation system is provided. The frequency modulation receiver comprises an automatic frequency controller and a signal detector. The automatic frequency controller receives a demodulated frequency modulation signal demodulated from a radio frequency signal and outputs a control voltage to control an oscillation frequency of a local oscillator according to the demodulated frequency modulation signal. The signal detector coupled to the automatic frequency controller receives the control voltage and determines whether the radio frequency signal is a frequency modulation signal according to the control voltage and a predetermined voltage range.

Furthermore, an exemplary embodiment of a frequency modulation signal receiving method for a frequency modulation system is provided. A demodulated frequency modulation signal demodulated from a radio frequency signal is received, and a control voltage is output to control an oscillation frequency of a local oscillator according to the demodulated frequency modulation signal. It is determined whether the radio frequency signal is a frequency modulation signal according to the control voltage and a predetermined voltage range.

Moreover, another exemplary embodiment of a frequency modulation receiver for a frequency modulation system is provided. The frequency modulation receiver comprises an antenna, a radio frequency amplifier, a mixer, a frequency modulation demodulator, an automatic frequency controller, a signal detector and a local oscillator. The antenna receives a radio frequency signal. The radio frequency amplifier amplifies the radio frequency signal. The mixer receives the amplified radio frequency signal and a local oscillation signal, and down converts the amplified radio frequency signal to an intermediate frequency to output an intermediate frequency signal according to the local oscillation signal. The frequency modulation demodulator coupled to the mixer receives the intermediate frequency signal and demodulates the intermediate frequency signal to output a demodulated frequency modulation signal. The automatic frequency controller coupled to the frequency modulation demodulator receives the demodulated frequency modulation signal and outputs a control voltage according to the demodulated frequency modulation signal. The signal detector coupled to the automatic frequency controller receives the control voltage and determines whether the radio frequency signal is a frequency modulation signal according to the control voltage and a predetermined voltage range. The local oscillator outputs to the local oscillation signal according to the control voltage.

Furthermore, another exemplary embodiment of a frequency modulation signal receiving method for a frequency modulation system is provided. A radio frequency signal is received. The radio frequency signal is amplified. The amplified radio frequency signal is down converted to an intermediate frequency to output an intermediate frequency signal according to a local oscillation signal. The intermediate frequency signal is demodulated and a demodulated frequency modulation signal is output. A control voltage is output to control an oscillation frequency of a local oscillator according to the demodulated frequency modulation signal. It is determined whether the radio frequency signal is a frequency modulation signal according to the control voltage and a predetermined voltage range.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
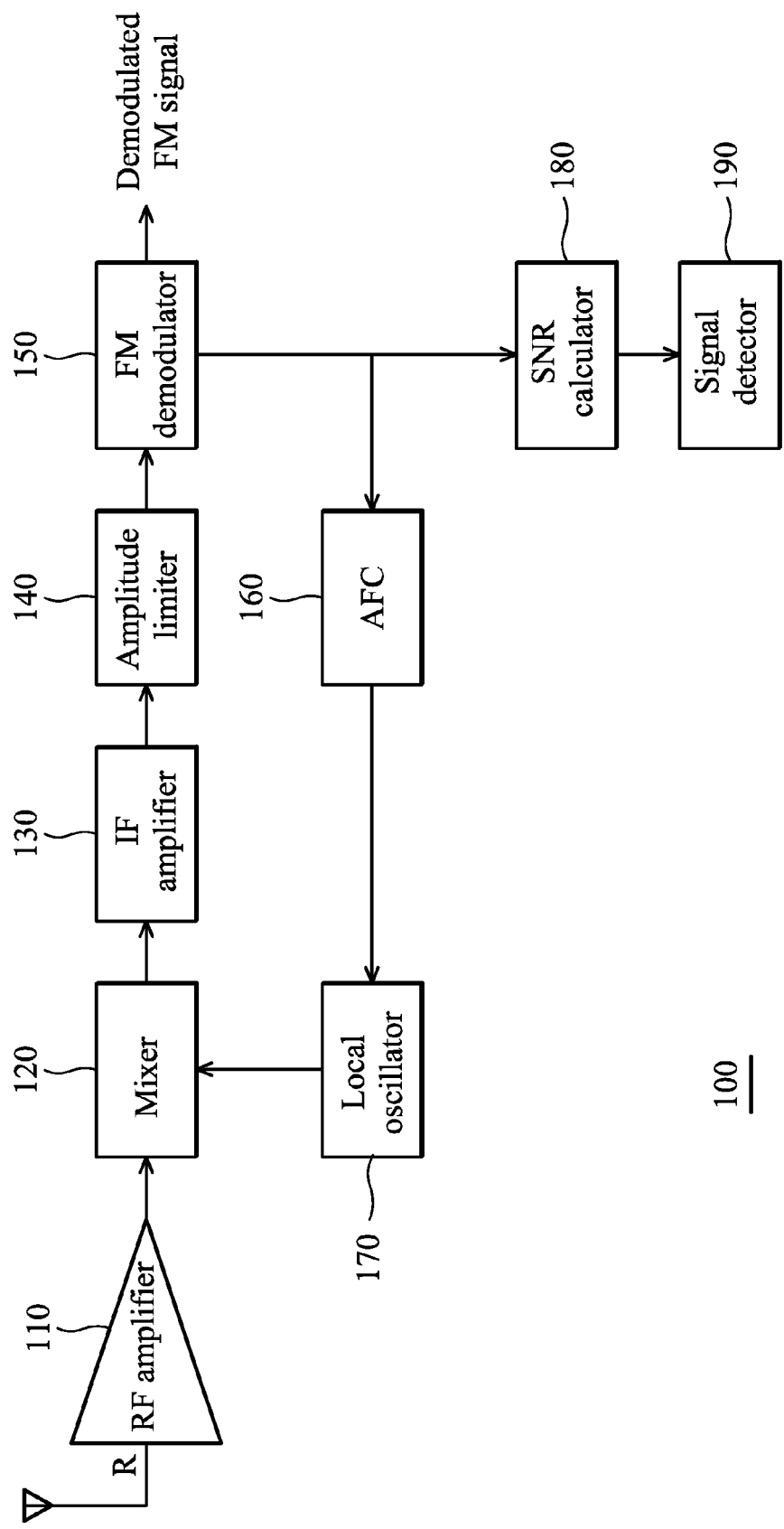
FIG. 1 shows a block diagram illustrating a conventional FM receiver 100.
Figure 2:
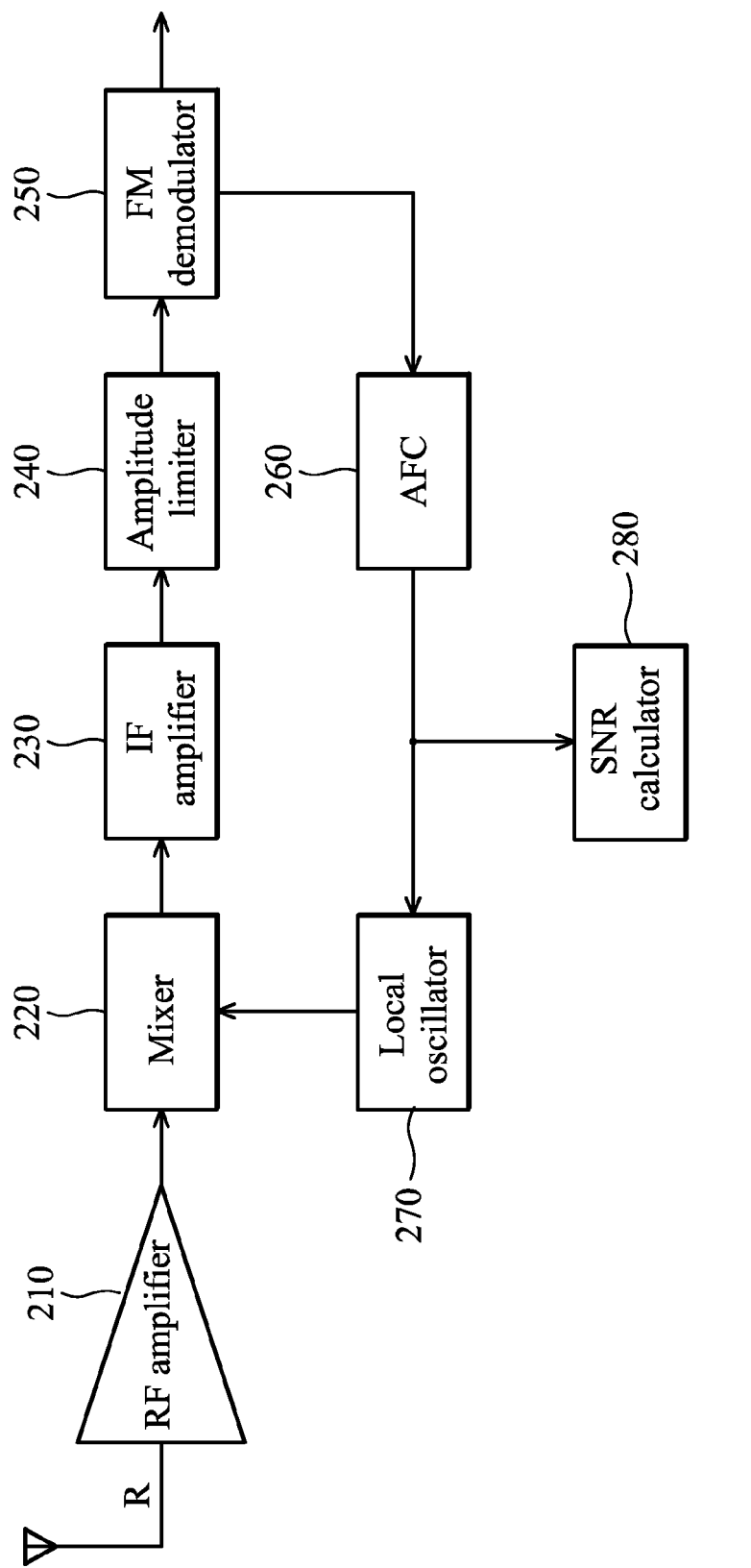
FIG. 2 shows a frequency modulation (FM) receiver 200 for signal determination according to an embodiment of the invention.

FIG. 2 shows a frequency modulation (FM) receiver 200 for signal determination according to an embodiment of the invention. The FM receiver 20 comprises an antenna, a radio frequency (RF) amplifier 210, a mixer 220, an intermediate frequency (IF) amplifier 230, an amplitude limiter 240, an FM demodulator 250, an automatic frequency controller (AFC) 260, a local oscillator 270 and a signal detector 280.

Figure 3:
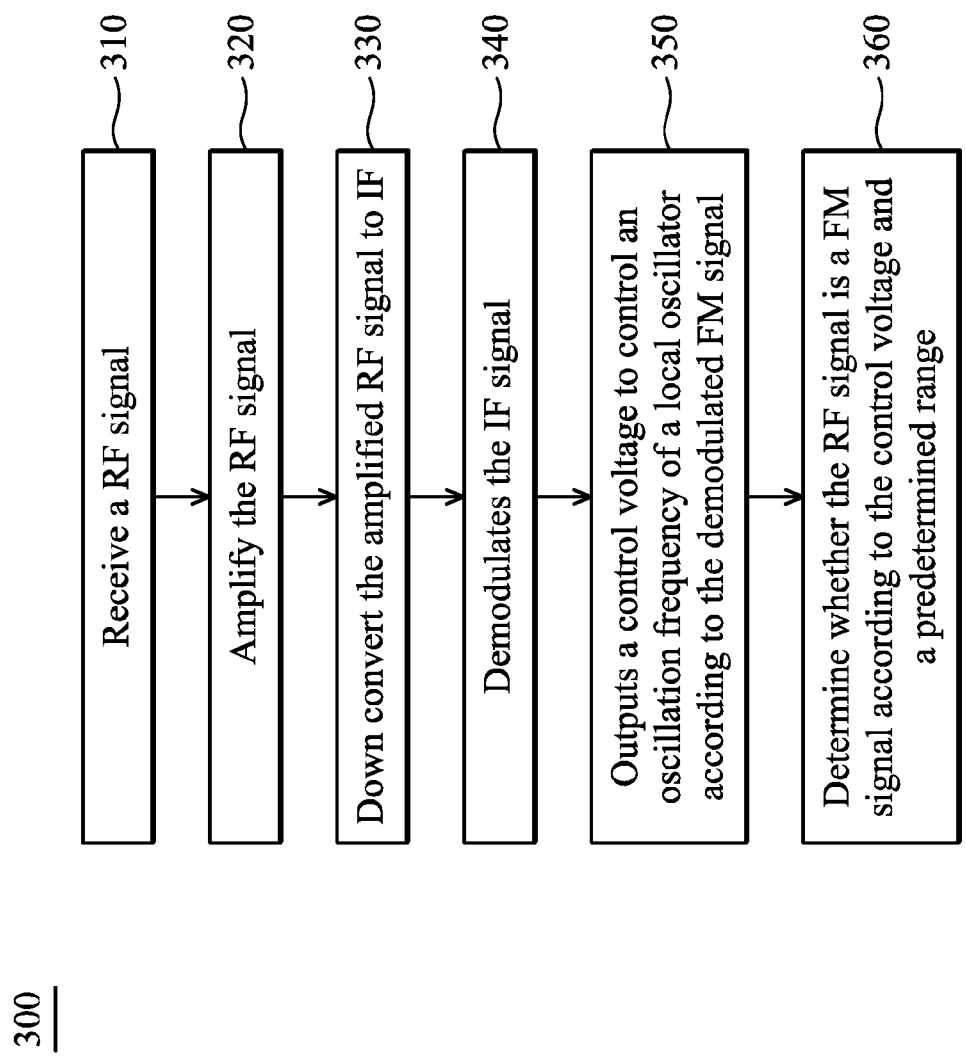
FIG. 3 shows an FM signal receiving method 300 according to an embodiment of the invention.

FIG. 3 shows an FM signal receiving method 300 according to an embodiment of the invention. The FM receiver 200 receives an RF signal R via the antenna (step 310). Next, the RF amplifier 210 amplifies the RF signal R (step 320). Next, the mixer 220 down converts the amplified RF signal to an IF according to a local oscillation signal (step 330). The IF amplifier 230 amplifies the down converted signal to output an IF signal. The amplitude limiter 240 limits an amplitude of the IF signal to decrease noise. The FM demodulator 250 demodulates the limited IF signal to output a demodulated FM signal (step 340).

Next, the demodulated FM signal is transmitted to the AFC 260, and the AFC 260 outputs a control voltage to control an oscillation frequency of the local oscillator 270 according to the demodulated FM signal (step 350). A loop formed by the mixer 220, the IF amplifier 230, the amplitude limiter 240, the FM demodulator 250, the AFC 260 and the local oscillator 270 may establish a feedback scheme. The feedback scheme may adjust the down-conversion error according to the demodulated FM signal such that the mixer 220 may accurately down convert the RF signal to a predetermined IF according to the local oscillation signal of the local oscillator 270. The control voltage output by the AFC 260 has a relationship with that whether the RF signal is an FM signal or not. If the RF signal is not the FM signal, the feedback scheme would not able to down convert the RF signal to the predetermined IF. Thus, the control voltage output by the AFC 260 according to the demodulated FM signal (i.e. non-FM signal) would be different from the control voltage corresponding to the FM signal. Furthermore, if the RF signal is a weak FM signal, the feedback scheme would not be able to adjust the down-conversion error to an allowable range. So, the control voltage output by the AFC 260 according to the weak FM signal would also be different from the control voltage corresponding to the FM signal with satisfactory strength. Therefore, when the RF signal is a valid FM signal, the control voltage output by the AFC 260 is within a predetermined voltage range. On the contrary, it is determined that the RF signal is an invalid FM signal when the control voltage is not within the predetermined voltage range. As a result, the signal detector 280 determines whether the RF signal is the FM signal or not according to the control voltage and a predetermined voltage range (step 360). The predetermined voltage range is determined according to the actual communication status.

Figure 4:
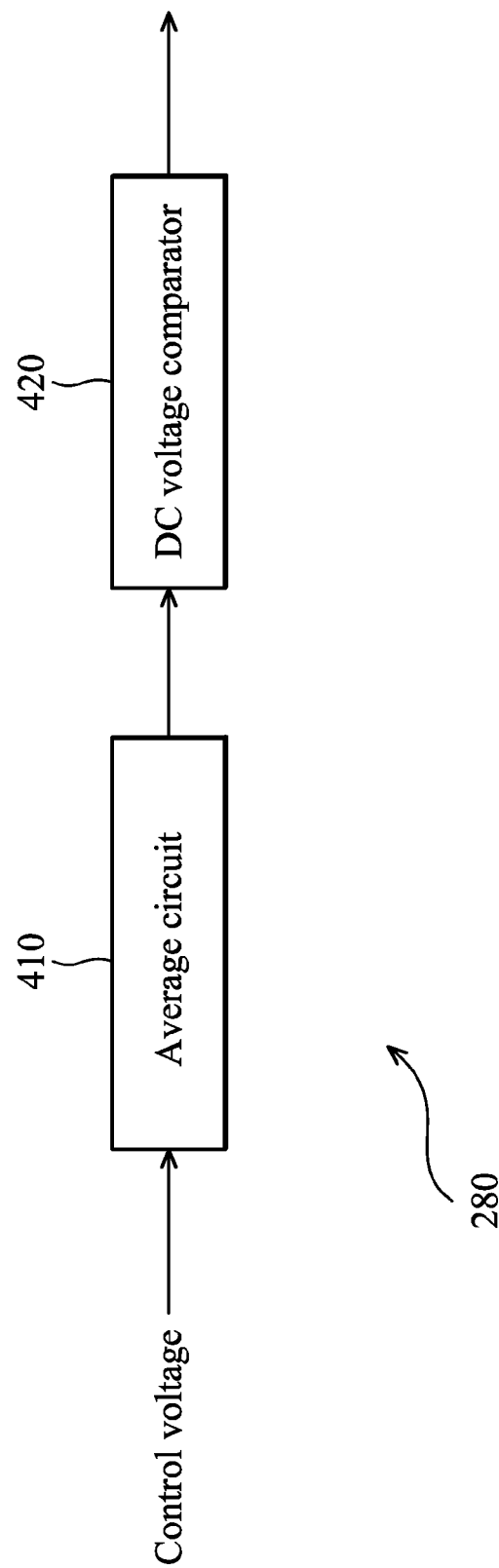
FIG. 4 shows a block diagram illustrating the signal detector 280 according to an embodiment of the invention.

FIG. 4 shows a block diagram illustrating the signal detector 280 according to an embodiment of the invention. The signal detector 280 comprises an average circuit 410 and a direct current (DC) voltage comparator 420. The average circuit 410 is coupled to the AFC 260, and the average circuit 410 receives the control voltage and outputs an average value of the control voltage. The average circuit 410 may be an integrator which integrates the control voltage during a predetermined time period and periodically outputs the integrated value. The average circuit 410 may also obtain a maximum value and a minimum value of the control voltage during a predetermined time period, and then the average circuit 410 may average the maximum and minimum values of the control voltage and periodically output the average value. The average circuit 410 may monitor the control voltage during a predetermined time period, thus avoiding error detection for the signal detector 280, wherein the error detection is caused by unstable control voltage, sudden large noise or signal attenuation. Furthermore, one skilled in the art may design various types of circuits according to the desired function of the average circuit 410. The voltage comparator 420 is coupled to the average circuit 410. The voltage comparator 420 determines that the RF signal is the FM signal when the average value of the control voltage is within the predetermined voltage range, and the voltage comparator 420 determines that the RF signal is not the FM signal when the average value of the control voltage is not within the predetermined voltage range.

Figure 5:
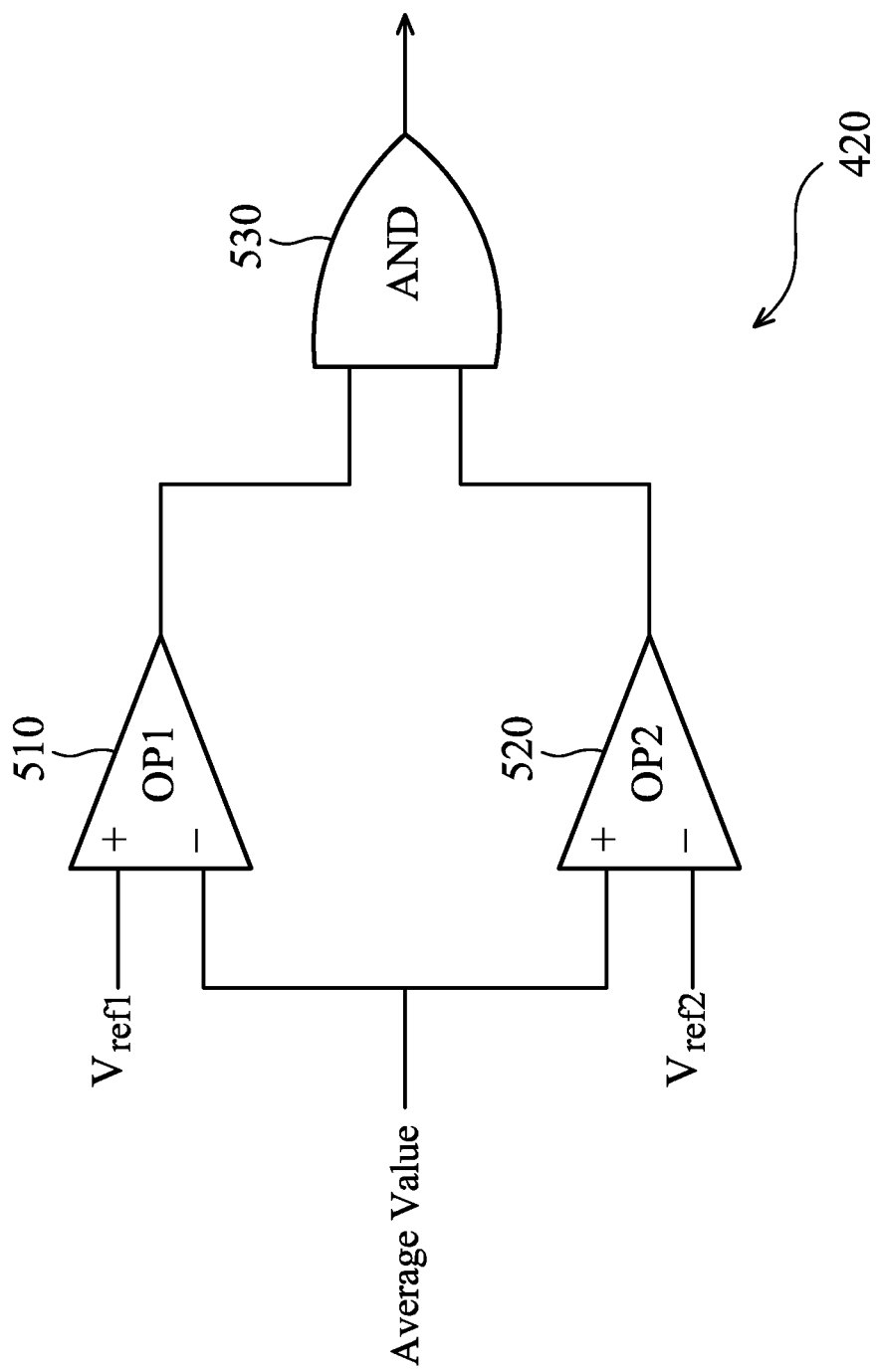
FIG. 5 shows a schematic diagram illustrating the voltage comparator 420 according to an embodiment of the invention.

FIG. 5 shows a schematic diagram illustrating the voltage comparator 420 according to an embodiment of the invention. The voltage comparator 420 comprises a first operational amplifier 510, a second operational amplifier 520 and a AND logic gate 530. The first operational amplifier 510 has an inverting input coupled to the average circuit 410 and a non-inverting input coupled to a first reference voltage $V_{ref1}$. The first operational amplifier 510 outputs a first comparing result according to the average value and the first reference voltage $V_{ref1}$. When the first reference voltage $V_{ref1}$ is larger than the average value, the first operational amplifier 510 outputs a high voltage to represent a logic "1". When the first reference voltage $V_{ref1}$ is smaller than the average value, the first operational amplifier 510 outputs a low voltage to represent a logic "0". Similarly, the second operational amplifier 520 has a non-inverting input coupled to the average circuit 410 and an inverting input coupled to a second reference voltage $V_{ref2}$. The second operational amplifier 520 outputs a second comparing result according to the average value and the second reference voltage $V_{ref2}$. When the second reference voltage $V_{ref2}$ is smaller than the average value, the second operational amplifier 520 outputs a high voltage to represent a logic "1". When the second reference voltage $V_{ref2}$ is larger than the average value, the second operational amplifier 520 outputs a low voltage to represent a logic "0". If the RF signal is the FM signal, the average value outputted by the average circuit 410 is within a range between the first reference voltage and the second reference voltage, such as the first reference voltage>the average value>the second reference voltage. Therefore, the first operational amplifier 510 may output a low voltage (i.e. logic "0") when the average value is larger than the first reference voltage $V_{ref1}$ or the second operational amplifier 520 may output a low voltage (i.e. logic "0") when the average value is smaller than the second reference voltage $V_{ref2}$. The AND logic gate 530 is coupled to the first operational amplifier 510 and the second operational amplifier 520, which outputs a determining signal to indicate whether the RF signal is the FM signal or not according to the first comparing result and the second comparing result. Both the first operational amplifier 510 and the second operational amplifier 520 may output a high voltage (i.e. logic "1") simultaneously only when the first reference voltage>the average value>the second reference voltage. Therefore, the AND logic gate 530 outputs a logic "1" to indicate that the RF signal is the FM signal, and the AND logic gate 530 outputs a logic "0" to indicate that the RF signal is not the FM signal. Those who are skilled in this technology can make various alterations for the voltage comparator 420.

The invention uses the AFC control voltage to determine whether the RF signal is the FM signal or not without use of the SNR, thus eliminating requirement for an SNR calculator. Furthermore, no additional circuits are required, as an AFC circuit is originally a required circuit for an FM receiver. Therefore, the invention decreases system complexity and cost for an FM receiver, and is able to determine whether the RF signal is the FM signal or not.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A frequency modulation receiver, comprising:
an automatic frequency controller, receiving a demodulated frequency modulation signal demodulated from a radio frequency signal and outputting a control voltage to control an oscillation frequency of a local oscillator according to the demodulated frequency modulation signal; and
a signal detector coupled to the automatic frequency controller, receiving the control voltage and determining whether the radio frequency signal is a frequency modulation signal according to the control voltage and a predetermined voltage range, wherein the signal detector further comprises:
an average circuit coupled to the automatic frequency controller, receiving the control voltage and outputting an average value of the control voltage; and
a voltage comparator coupled to the average circuit, wherein the voltage comparator determines that the radio frequency signal is the frequency modulation signal when the average value is within the predetermined voltage range, and the voltage comparator determines that the radio frequency signal is not the frequency modulation signal when the average value is not within the predetermined voltage range, wherein the voltage comparator further comprises:
a first operational amplifier coupled to the average circuit, outputting a first comparing result according to the average value and a first reference voltage;
a second operational amplifier coupled to the average circuit, outputting a second comparing result according to the average value and a second reference voltage; and
a AND logic gate coupled to the first operational amplifier and the second operational amplifier, outputting a determining signal to indicate whether the radio frequency signal is the frequency modulation signal according to the first comparing result and the second comparing result.

2. The frequency modulation receiver as claimed in claim 1, wherein the average value is obtained according to an average of a maximum value and a minimum value of the control voltage during a first time period.

3. A frequency modulation signal receiving method, comprising:
receiving a demodulated frequency modulation signal demodulated from a radio frequency signal, and outputting a control voltage to control an oscillation frequency of a local oscillator according to the demodulated frequency modulation signal; and
determining whether the radio frequency signal is a frequency modulation signal according to the control voltage and a predetermined voltage range,
wherein the step of determining whether the radio frequency signal is the frequency modulation signal further comprises:
determining whether the radio frequency signal is the frequency modulation signal according to an average value of the control voltage;
determining that the radio frequency signal is the frequency modulation signal by a voltage comparator when the average value is within the predetermined voltage range; and
determining that the radio frequency signal is not the frequency modulation signal by the voltage comparator when the average value is not within the predetermined voltage range,
wherein the voltage comparator comprises:
a first operational amplifier, outputting a first comparing result according to the average value and a first reference voltage;
a second operational amplifier, outputting a second comparing result according to the average value and a second reference voltage; and
a AND logic gate coupled to the first operational amplifier and the second operational amplifier, outputting a determining signal to indicate whether the radio frequency signal is the frequency modulation signal according to the first comparing result and the second comparing result.

4. The frequency modulation signal receiving method as claimed in claim 3, wherein the average value is obtained according to an average of a maximum value and a minimum value of the control voltage during a first time period.

5. A frequency modulation receiver, comprising:
an antenna, receiving a radio frequency signal;
a radio frequency amplifier, amplifying the radio frequency signal;
a mixer, receiving the amplified radio frequency signal and a local oscillation signal, and down converting the amplified radio frequency signal to an intermediate frequency to output an intermediate frequency signal according to the local oscillation signal;
a frequency modulation demodulator coupled to the mixer, receiving the intermediate frequency signal and demodulating the intermediate frequency signal to output a demodulated frequency modulation signal;
an automatic frequency controller coupled to the frequency modulation demodulator, receiving the demodulated frequency modulation signal and outputting a control voltage according to the demodulated frequency modulation signal;

a signal detector coupled to the automatic frequency controller, receiving the control voltage and determining whether the radio frequency signal is a frequency modulation signal according to the control voltage and a predetermined voltage range; and a local oscillator, outputting the local oscillation signal according to the control voltage, wherein the signal detector further comprises:

an average circuit coupled to the automatic frequency controller, receiving the control voltage and outputting an average value of the control voltage; and a voltage comparator coupled to the average circuit, wherein the voltage comparator determines that the radio frequency signal is the frequency modulation signal when the average value is within the predetermined voltage range, and the voltage comparator determines that the radio frequency signal is not the frequency modulation signal when the average value is not within the predetermined voltage range, wherein the voltage comparator further comprises:

a first operational amplifier coupled to the average circuit, outputting a first comparing result according to the average value and a first reference voltage;

a second operational amplifier coupled to the average circuit, outputting a second comparing result according to the average value and a second reference voltage; and a AND logic gate coupled to the first operational amplifier and the second operational amplifier, outputting a determining signal to indicate whether the radio frequency signal is the frequency modulation signal according to the first comparing result and the second comparing result.

6. The frequency modulation receiver as claimed in claim 5, wherein the average value is obtained according to an average of a maximum value and a minimum value of the control voltage during a first time period.

7. A frequency modulation signal receiving method, comparing:

receiving a radio frequency signal;

amplifying the radio frequency signal; down converting the amplified radio frequency signal to an intermediate frequency to output an intermediate frequency signal according to a local oscillation signal;

demodulating the intermediate frequency signal and outputting a demodulated frequency modulation signal;

outputting a control voltage to control an oscillation frequency of a local oscillator according to the demodulated frequency modulation signal; and determining whether the radio frequency signal is a frequency modulation signal according to the control voltage and a predetermined voltage range, wherein the step of determining whether the radio frequency signal is the frequency modulation signal further comprises:

determining whether the radio frequency signal is the frequency modulation signal according to an average value of the control voltage;

determining that the radio frequency signal is the frequency modulation signal by a voltage comparator when the average value is within the predetermined voltage range; and determining that the radio frequency signal is not the frequency modulation signal by the voltage comparator when the average value is not within the predetermined voltage range, wherein the voltage comparator comprises:

a first operational amplifier, outputting a first comparing result according to the average value and a first reference voltage;

a second operational amplifier, outputting a second comparing result according to the average value and a second reference voltage; and a AND logic gate coupled to the first operational amplifier and the second operational amplifier, outputting a determining signal to indicate whether the radio frequency signal is the frequency modulation signal according to the first comparing result and the second comparing result.

8. The frequency modulation signal receiving method as claimed in claim 7, wherein the average value is obtained according to an average of a maximum value and a minimum value of the control voltage during a first time period.

* * * * *